(12) United States Patent
Allcock et al.

(10) Patent No.: US 6,558,546 B2
(45) Date of Patent: May 6, 2003

(54) PH DEPENDENT MEMBRANE DIFFUSION

(75) Inventors: Harry R. Allcock, State College, PA (US); Jared Bender, State College, PA (US); Roy H. Hammerstedt, Boalsburg, PA (US); Stephen Schwartz, State College, PA (US); Walter Laredo, Hillsborough, NJ (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 10/001,899

(22) Filed: Nov. 1, 2001

(65) Prior Publication Data

US 2002/0088748 A1 Jul. 11, 2002

Related U.S. Application Data

(60) Provisional application No. 60/245,092, filed on Nov. 1, 2000.

(51) Int. Cl.$^7$ .................. B01D 39/00; B01D 39/14; B01D 71/06
(52) U.S. Cl. .............. 210/500.27; 210/500.28; 210/500.29; 210/500.3; 210/500.31; 210/500.32; 210/500.33; 210/500.34; 210/500.35; 210/500.36; 210/500.37; 210/500.38; 210/500.39; 210/500.4; 210/500.41; 210/500.42; 210/500.43; 210/527; 210/634; 210/638; 210/639; 210/640; 428/305.5; 428/317.9
(58) Field of Search .............. 428/305.5, 317.9; 210/500.27–500.43, 634, 638, 639, 640, 527

(56) References Cited

U.S. PATENT DOCUMENTS

| | | | | | |
|---|---|---|---|---|---|
| 4,728,345 | A | * | 3/1988 | Murphy | 96/13 |
| 5,026,342 | A | * | 6/1991 | Hammerstedt et al. | 435/2 |
| 5,053,451 | A | * | 10/1991 | Allcock et al. | 524/600 |
| 5,066,398 | A | * | 11/1991 | Soria et al. | 210/321.89 |
| 5,238,569 | A | * | 8/1993 | Soria et al. | 210/500.27 |
| 5,261,870 | A | * | 11/1993 | Hammerstedt et al. | 600/33 |
| 5,898,062 | A | * | 4/1999 | Allcock et al. | 528/168 |
| 6,315,767 | B1 | * | 11/2001 | Dumont et al. | 128/DIG. 24 |

* cited by examiner

Primary Examiner—Terrel Morris
Assistant Examiner—Leanna Roché
(74) Attorney, Agent, or Firm—Webb Ziesenheim Logsdon Orkin & Hanson, P.C.

(57) ABSTRACT

A pore plugging material, for pH dependent membrane diffusion, in which cyclic olefins having phosphazene-functional moieties provide predictable erosion properties when used to plug pores in separation barriers and other porous membranes. Specific properties of the polymers are dependent on several factors, including molecular weight and identity of side groups attached to the phosphazene moiety. However, as a class, phosphazene-functional cyclic olefins provide both predictable erodibility and uniformly benign hydrolysis products and are, therefore, uniquely suitable as pore plugging polymers for separation barriers and membranes of all kinds. The invention, therefore, embraces the provision of a pH-sensitive erodible pore plugging material for pores in separation barriers and membranes of all kinds.

9 Claims, 4 Drawing Sheets

PH DEPENDENT MEMBRANE DIFFUSION

CROSS-REFERENCE TO RELATED APPLICATION

This patent application claims priority to, and incorporates herein by reference, U.S. Provisional Application Ser. No. 60/245,092, filed Nov. 1, 2000.

BACKGROUND OF THE INVENTION

1. Field of the Invention

The present invention relates to the preparation of selectively permeable pores in separation membranes of all kinds.

2. Background of the Invention

The use of membrane filters to separate molecules and particles by size is well-known, but passage of molecules or particles larger than the nominal pore size, in a membrane or container wall, is not well developed in the prior art.

In many instances, controlled passage through pores can be accomplished by occluding the pores with an erodible material to provide a separation barrier with plugged pores such as is disclosed in U.S. Pat. Nos. 5,026,342 and No. 5,261,870, incorporated herein by reference. With the separation membrane disclosed in these patents, transmembrane passage is allowed only after appropriate environmental conditions have caused or allowed erosion of the material plugging the pores. Mechanical control devices are thus unnecessary, and such membranes are useful to initiate controlled passage of materials of appropriate size through the pores of the membrane.

The membranes in question, which contain pores for particular separations, take many forms. Certain membranes contain fibril membranes with a "haystack" structure, in which limits to a separation are accomplished by tortuous passageways of varying size through a crisscrossed bed of filter materials. Alternative membranes contain a sponge-like structure, in which tortuous pores of varying size and configuration are present, sometimes generated by proprietary technologies involving gas extrusion or other pore generation techniques. Additional membrane types may have capillary-pore or track-etched membranes with a "tunnel" structure, created in a solid sheet of base membrane material by inducing highly controlled physical damage in the membrane and then etching the damaged areas to create pores of uniform diameter through the membrane. Various polymers of many types may be used to form all of these and other membranes.

Information from published product literature illustrates another difference between microporous and capillary-pore membranes. Literature produced by Millipore, Inc. provides illustrations and notes that in their microporous membranes the passageways have a range of diameters. It is stated that their "10 micrometer pore" product has approximately 68% passageways of nominal 10 micrometer diameter (range not known), but approximately 32% passageways smaller than the nominal 10 micrometers. In contrast, one vendor of capillary-pore membranes (Oxyphen AG) provides illustrations and states that the tunnel-like pores are of uniform diameter and all are within ±10% of the stated diameter. Hence, capillary-pore membranes have greater uniformity of the transmembrane passageway than microporous or fibril membranes do.

To increase the value of any membrane filter, the surface of the membrane and/or the passageways can be changed after formation of the pores, by one of several chemical modifications. One example is plasma treatment of the membrane in the presence of ammonia gas to create amine functions on exposed surfaces, or by activation followed by a plunge into acrylic acid. Such treatments change transport properties across the passageways or pores. Other examples of providing membranes responsive to environmental changes include preparation of: 1) co-polypeptide membranes leading to a membrane with microdomains of polyamino acids and, thereby, providing a responsive base membrane; and 2) asymmetric polypeptide membranes, with a two layered membrane providing a responsive network.

Inherent to the manufacture of capillary-pore membranes is extensive introduction of charges on the face of the tunnel or passageway, with minimal formation of charges on the general polymer faces. This is because capillary-pore membranes are produced by physically damaging polymer film in a controlled manner with a beam of heavy ions (e.g., krypton) in a cyclotron. The ions follow a linear path where interaction with polymer chains of the membrane releases energy to damage molecules in the polymer matrix. Damage represents latent pores, which subsequently are opened by chemical etching, such as with cyclical treatment with alkaline and acid solutions. Specifically, carboxyl functions may be formed with etching treatments such as these.

Literature on track etching and production and use of capillary-pore membranes reveals that it is known to track-etch thin sheets of solids; that coating pores with fatty acid monolayers or non-specific adsorbed proteins can be used to change pore properties; and that certain polymers such as cellulose polymers are very sensitive to environmental conditions so that quality of track images in cellulose polymers depends on how the material was prepared. In addition, it is also known that in order to create carboxyl functionality during track-etching, oxygen must be present, and in instances in which chemically active and/or ionic groups are desired to be attached to pores in order to mediate pore permeability, tunnels in capillary-pore membranes are well suited to promote attachment of such chemically active and/or ionic groups.

All of the above-described technology pertains in one way or another to the designing of permeable membranes of specialized design. Many membranes simply must be provided with initially completely plugged pores, however, when a separation membrane needs first to function as the wall of a container and to perform its separation function at a point later in time. Some of the disadvantages of erodible plugs for pores, in membranes and other separation devices, is that the erosion or hydrolysis products of the erodible plugging materials impart unwanted properties to the surrounding system, which system is in many cases a sensitive biological system. Also, erodibility of certain plugging materials is not as exacting as a particular application would dictate, with certain cellulose polymers being erodible but not as predictably or quickly as desired. A need remains, therefore, for a pore-plugging material, for separation barriers generally and membranes in particular, in which erosion of the plug after formation is precipitated by a particular pH event and in which the hydrolytic products of the erosion are biologically benign.

SUMMARY OF THE INVENTION

In order to meet this need, the present invention is a pore plugging material, for pH dependent membrane diffusion, in which cyclic olefins having phosphazene-functional moieties provide predictable erosion properties when used to plug pores is separation barriers and other porous membranes. Specific properties of the polymers are dependent on several factors, including molecular weight and identity of side groups attached to the phosphazene moiety. However, as a class, phosphazene-functional cyclic olefins provide both predictable erodibility and uniformly benign hydrolysis products and are, therefore, uniquely suitable as pore plugging polymers for separation barriers and membranes of all kinds. The invention, therefore, embraces the provision of a pH-sensitive erodible pore plugging material to pores in separation barriers and membranes of all kinds.

DETAILED DESCRIPTION OF THE PREFERRED EMBODIMENT

Figure 1:
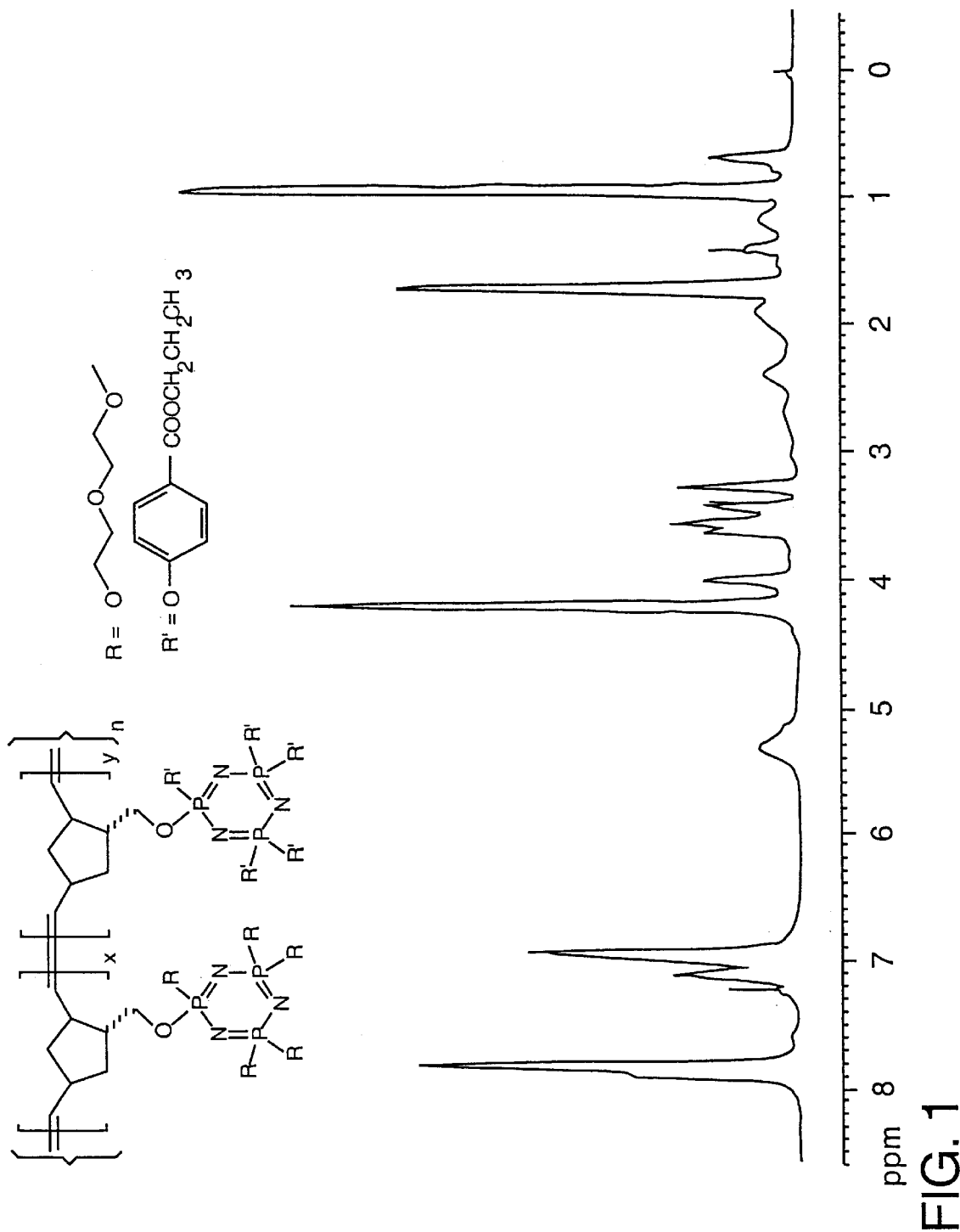
FIG. 1 is a line drawing of an exemplary chemical compound and an $^1$H NMR spectrum for a phosphazene-functional cyclic olefin pore plugging material according to the present invention.

The present invention is a pore plugging material, for pH dependent membrane diffusion, in which cyclic olefins having phosphazene-functional moieties provide predictable erosion properties when used to plug pores in separation barriers and other porous membranes. Specific properties of the polymers are dependent on several factors, including molecular weight and identity of side groups attached to the phosphazene moiety. However, as a class, phosphazene-functional cyclic olefins provide both predictable erodibility and uniformly benign hydrolysis products and are, therefore, uniquely suitable as pore plugging polymers for separation barriers and membranes of all kinds.

The polymer backbone of such a phosphazene-functional cyclic olefin, without limitation, may be 5-substituted polynorbornene, such that typically one pendent cyclotriphosphazene ring per repeat unit at the 5-position imparts an acidic function. The preparation and use of this polymer is not to be considered limiting with respect to the practice of the present invention; the details below are exemplary only.

Synthesis of phosphazene-functional inorganic-organic polymers via the ring-opening metathesis polymerization (ROMP) is described below. Properties of these polymers are dependent on several factors, including molecular weight and side groups attached to the phosphazene moiety. When carboxylic acid side groups are used, pH-sensitive polymers are obtained. After ionization (at pH>7), the polymer is water soluble and "expanded" due to repulsion of carboxylate groups. The anionic properties of these materials is further confirmed by their cross-linking in the presence of divalent cations such as Ca++. At pH values below five, the polymer is in a tightly compacted highly organized form due to hydrogen bonding via the carboxylic acid groups. The solubility of this material at these lower pH values is limited in polar organic solvents.

The preferred embodiment of the invention embodies a polymer system with a relatively high percentage of ionizable groups for a maximum swelling, and substantial amounts of alkyl ether groups for improved solubility. The invention moreover takes advantage of the characteristics of polyphosphazenes, namely, that polyphosphazenes with alkyl ether side groups are highly soluble materials, and ionic hydrogels reach their equilibrium degree of swelling much faster than alkyl ether-based hydrogels under the same conditions. As described above, a typical polymer family is represented by 5-substituted polynorbornene as the parent backbone, and inclusion of one pendent cyclotriphosphazene ring per repeat unit at the 5-position, with an acidic function. The initiator chosen was the well-known Grubbs initiator $(PCy_3)_2Cl_2Ru=CHPh$, chosen due to its well-known tolerance of polar functional groups in addition to its ability to polymerize highly strained and low strained cyclic olefins. The monomer to initiator ratio chosen for all reactions was 50:1, and reactions were carried out in $CH_2Cl_2$ at room temperature according to methods known in the art, with 10 ml solvent used per gram of monomer. Following purification of the polymer by precipitation into methanol, the backbone olefin groups were hydrogenated with a 15-fold excess of p-toluenesulfonhydrazide in refluxing dioxane. Hydrogenation of the double bonds was necessary to prevent side reactions during the deprotection steps.

The disappearance of olefin proteins was monitored by following hydrogenation at approximately 5 ppm in the $^1$H NMR spectrum. Between 50% and 90% of the phosphazene rings contained 4-propylcarboxylatophenolate (PRO) groups with the remaining 10% to 50% phosphazene rings being functionalized with methoxy(ethoxyethoxy) (NEE) groups.

Figure 2:
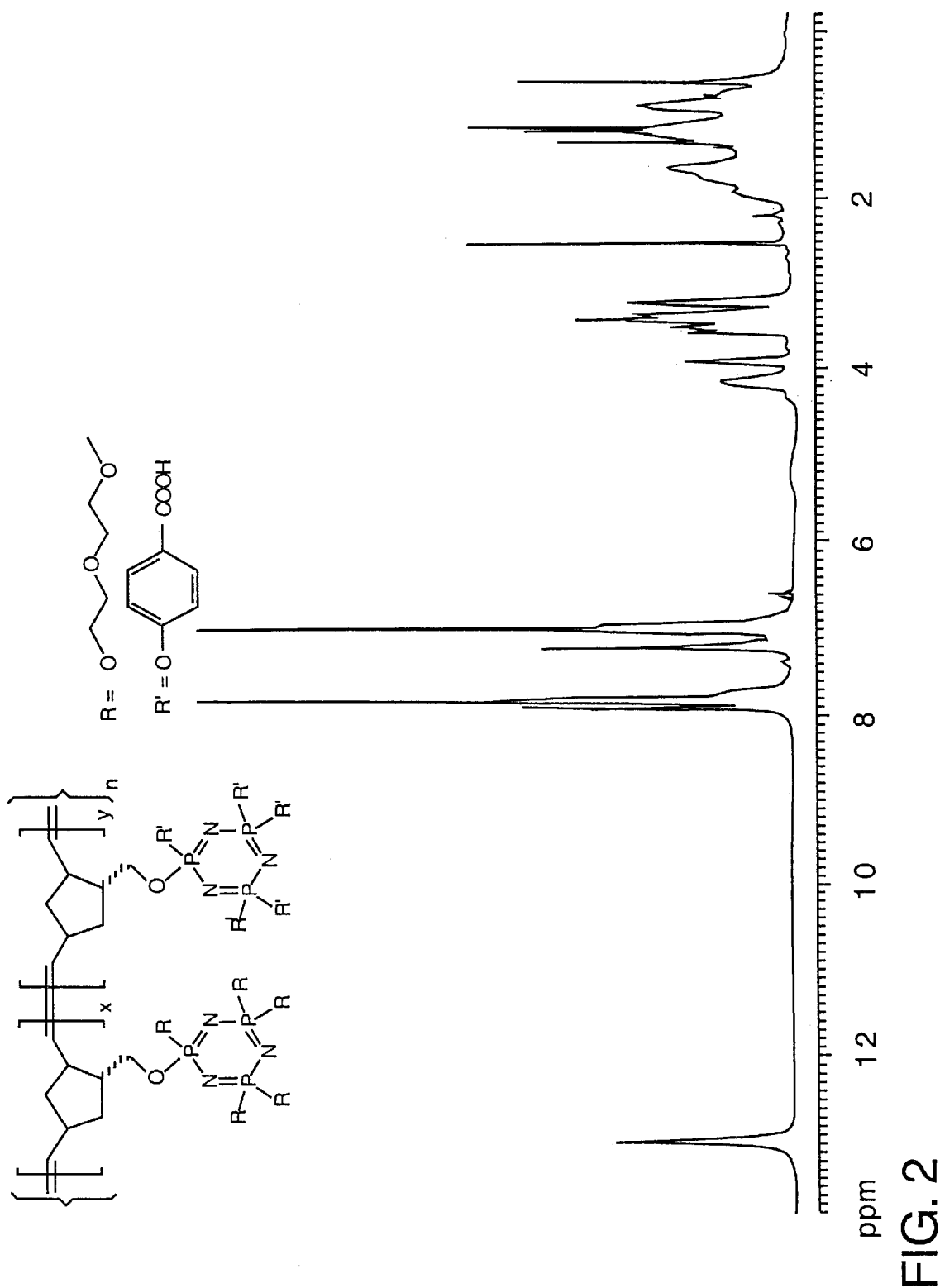
FIG. 2 is an $^1$H NMR spectrum (13.0 ppm) showing that upon deprotection of the compound illustrated in FIG. 1, acid groups appear and propyl groups disappear.

The PRO and MEE monomers were combined in different ratios and subsequently polymerized to yield unique random copolymers. All polymers were soluble in tetrahydrofuran. Polymers containing 40% to 50% MEE groups were slightly adhesive in appearance. Polymers with 10% to 20% MEE groups were found to be less adhesive and were considered adequate for use, and were thence hydrolyzed with an excess (1.5 molar equivalents per ester) of potassium ter-butoxide in THF (plus one drop of water was added per gram of polymer) to remove the pendent propyl ester groups of the polymer. The deprotection was carried out at room temperature for 48 to 72 hours, or until complete disappearance of the n-propyl peaks were observed. Deprotection of the ester groups under reflux was not conducted to avoid hydrolysis of the phosphazene rings from the polymer. Polymers were recovered from the crude reaction mixture by the addition of dilute HCl to pH 3 followed by centrifugation to recover solids. The resultant polymer was an off-white fine powder. The structure and $^1$H NMR spectrum of the protected polymer % MEE is provided in FIG. 1. Deprotection resulted in the complete disappearance of propyl groups with a concurrent appearance of acid groups at 13.0 ppm in the $^1$H spectrum (FIG. 2).

Figure 3A:
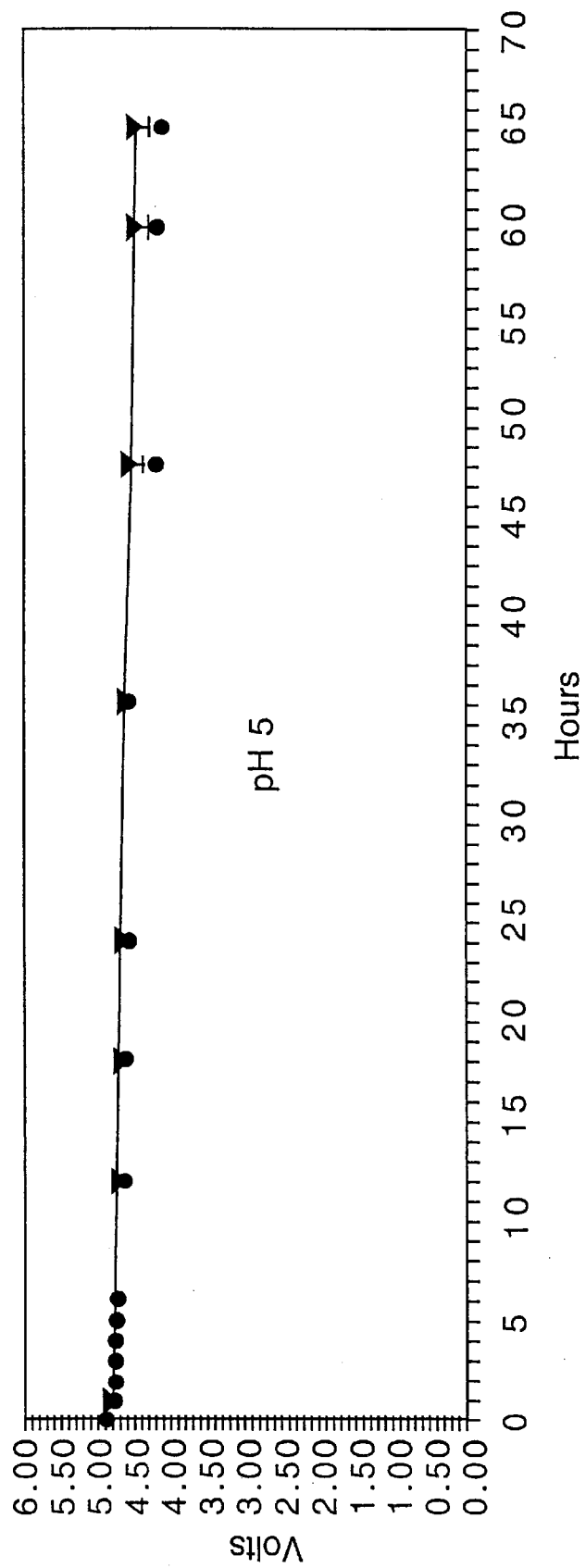
FIGS. 3A and 3B are line graphs showing representative data for the effect of pH on the opening of gated pores prepared according to the following description.
Figure 3B:
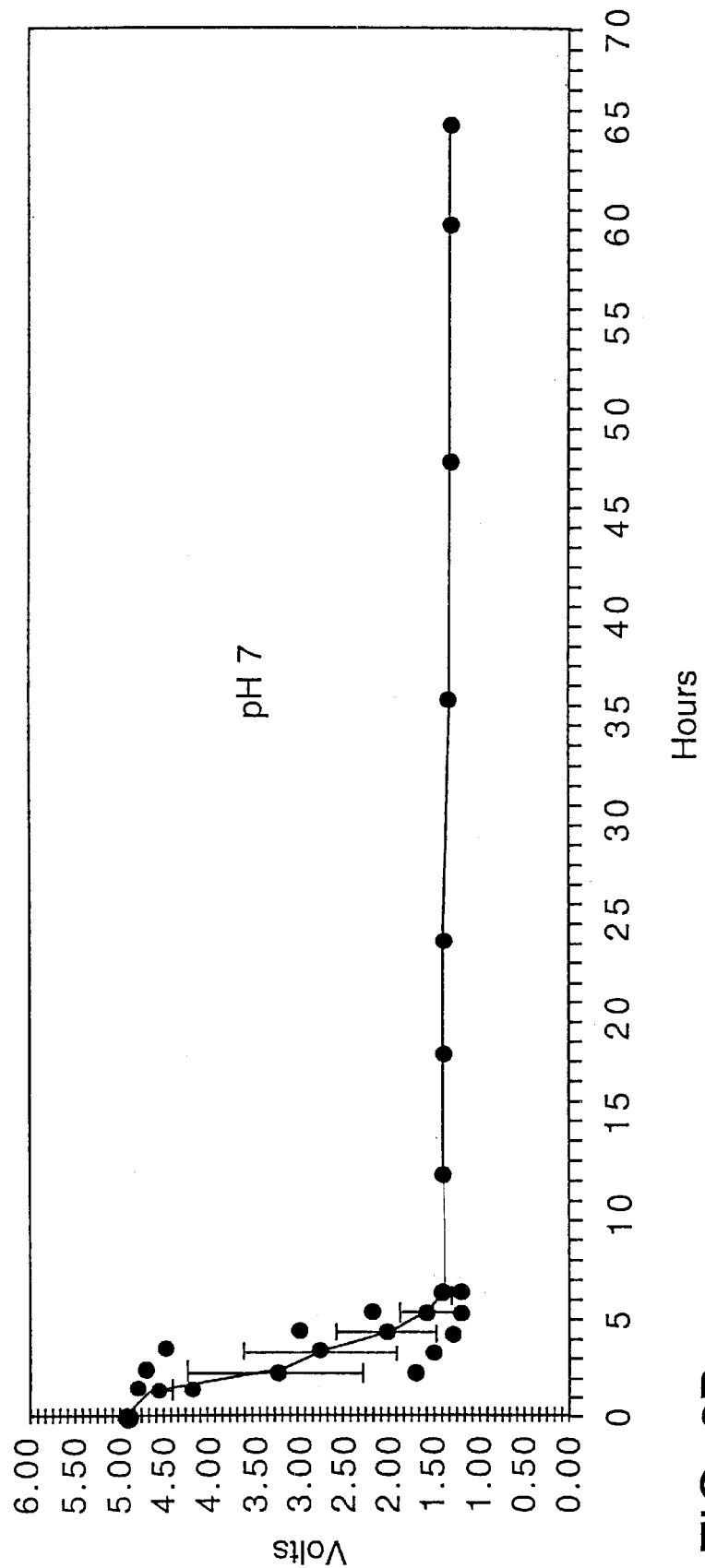

The method for plugging pores in a membrane with phosphazene-functionalized cyclic olefins according to the present invention is as follows. Polymer (for example, containing 90% PRO groups and 10% MEE groups) was coated onto one face of a capillary-pore polyester membrane and the solvent was allowed to evaporate to yield a membrane in which the capillary pores were filled with the polymer. The plugged pores and the membrane thus constituted a "closed" gate membrane. The "closed" gate membrane was thereafter placed into a device that held the membrane and allowed measurement of transmembrane current flow. A constant current was applied and a drop in resistance across the polymer/membrane indicated ion passage. Representative data for evaluation of the filled pores is shown in FIG. 3. Electrochemical measurements taken over a 65-hour time interval showed no drop in voltage when the buffer was at pH 5. When placed in buffer pH 7, a sharp drop in voltage was observed. This was indicative of opened pores and free contact of the buffer solutions above and below the polymer/membrane device. Continued monitoring of polymer samples in buffer pH 5 and pH 7 for five additional days showed no electrochemical change from that seen at 65 hours. At the end of five days, small amounts of 1N NaOH were added periodically to the pH 5 bath. The bath was initially allowed to equilibrate for 2.5 hours. Within 24 hours, as the pH of the buffer bath approached pH 6.8, the electrochemical measurements observed showed a sharp drop in voltage.

In summary, pores opened when the hydrogen bonded network of protonated carboxyl groups was converted to anionic carboxylate groups, during an increase in pH. Water was able to flow through the pores while simultaneously displacing the polymer. The facile release of polymer was attributed to the osmotic pressure build-up within the pores as a result of the negatively charged ions. Hence, the polymer was driven out of the pores, causing diffusion of ions through the membrane, resulting in a drop in resistance across the membrane (drop in voltage).

Alternative phosphazene-functionalized polynorbornenes may be those which contain amine moieties, or which contain polyoxanorbornene structure. The amine moiety dissolves in acidic medium (ammonium salt) yet is insoluble in basic medium (free amine), which means that aminated polymers become more erodible when pH is reduced. Additional side groups, among many, could be $OCH_2CH_2NH_2$, $NHCH_2CH_2HN_2$, etc. The present invention, therefore, embraces polymers which become more erodible both at increased or decreased pH, examples having been given of each. Moreover, the change in pH may be relative only, and need not span from acidic to basic per se or vice versa.

Although the invention has been described with particularity above, in reference to particular materials and methods, the invention is only to be limited insofar as is set forth in the accompanying claims.

We claim:

1. A gated pore membrane in which a pore plugging material resides within each pore of a material having pores, wherein said pore plugging material becomes increasingly erodible upon pH alteration of the environment immediately adjacent said material, and wherein said pore plugging material is selected from the group consisting of phosphazene-functionalized cyclic olefin, phosphazene-functionalized polynorbornene, and phosphazene-functionalized polyoxanorbornene.

2. The gated pore membrane according to claim 1, wherein said pore plugging material is a phosphazene-functionalized cyclic olefin.

3. The gated pore membrane according to claim 1, wherein said pore plugging material is a phosphazene-functionalized polynorbornene.

4. The gated pore membrane according to claim 1, wherein said pore plugging material is a phosphazene-functionalized polyoxanorbornene.

5. The gated pore membrane according to claim 1, wherein said pore plugging material is a phosphazene-functionalized polynorbornene wherein the phosphazene moiety further contains groups selected from the group consisting of methoxy(ethoxyethoxy) and propylcarboxy-latophenolate.

6. The gated pore membrane according to claim 5, wherein said phosphazene moiety further contains carboxylic acid side groups.

7. A method for gating a pore in a porous membrane, comprising the steps of: (a) plugging a pore in a membrane with a phosphazene-functionalized cyclic olefin and (b) at a point later in time, subjecting the plugged pore thus formed to an acidified environment.

8. The method according to claim 7, wherein said phosphazene-functionalized cyclic olefin is a phosphazene-functionalized polynorbornene.

9. The method according to claim 7, wherein said phosphazene-functionalized cyclic olefin is a phosphazene-functionalized polyoxanorbornene.

\* \* \* \* \*